United States Patent [19]
Fremont

[11] 3,986,951
[45] Oct. 19, 1976

[54] CHLORINE-BASED BLEACHERY EFFLUENT TREATMENT

[75] Inventor: Henry A. Fremont, Wyoming, Ohio

[73] Assignee: Champion International Corporation, Stamford, Conn.

[22] Filed: Nov. 18, 1975

[21] Appl. No.: 633,123

[52] U.S. Cl. .............................. 204/95; 210/42 R; 210/45; 210/22 R; 162/29; 162/DIG. 8; 204/149; 204/152; 423/473; 423/499; 423/641; 204/98; 204/128

[51] Int. Cl.² .................... D21C 11/10; B01D 13/02

[58] Field of Search ................ 162/29, 88, 89, 189, 162/DIG. 8; 204/94, 95, 149, 152, DIG. 6; 210/22, 42, 45, 321 A; 423/473, 499, 641

[56] References Cited
UNITED STATES PATENTS

| | | | |
|---|---|---|---|
| 2,201,812 | 5/1940 | Daniel | 210/42 |
| 2,784,158 | 3/1957 | Bodamer | 210/321 A |
| 3,268,441 | 8/1966 | Lindstrom | 210/22 |
| 3,442,778 | 5/1969 | Westerlund | 162/DIG. 8 |
| 3,485,729 | 12/1969 | Hertz | 204/149 |
| 3,627,479 | 12/1971 | Yee | 210/45 |
| 3,627,679 | 12/1971 | Fuller | 210/45 |
| 3,691,041 | 9/1972 | Stralser | 204/152 |
| 3,694,307 | 9/1972 | Iwahashi | 162/DIG. 8 |
| 3,793,174 | 2/1974 | Ichiki | 204/149 |
| 3,935,092 | 1/1976 | Bizot | 210/321 A |

FOREIGN PATENTS OR APPLICATIONS

| | | | |
|---|---|---|---|
| 928,008 | 6/1973 | Canada | 162/DIG. 8 |

OTHER PUBLICATIONS

"Electrolytic Coagulation of Ligrin from Kraft Mill Bleach Plant Wastewaters," Herer & Woodard & Tappi, vol. 59, No. 1, Jan. 1976, pp. 134–136.

"The World's First Closed–cycle Bleached Kraftmill is now Being Built," Tapp, vol. 59, No. 2, Feb. 1976, p. 26.

Primary Examiner—Charles N. Hart
Assistant Examiner—Ernest G. Therkorn
Attorney, Agent, or Firm—Evelyn M. Sommer

[57] ABSTRACT

The method of treating a chlorine-based total bleachery effluent in which only a chlorine and sodium salts are used in the bleach sequence comprising the steps of adding aluminum ion to said effluent in an amount sufficient to precipitate substantially all of the organics and suspended solids therein, separating the solids from said effluent, electrodialyzing the treated effluent to provide two effluent streams, one containing 200 to 600 parts per million sodium chloride which can be returned to the bleachery, and a second concentrated stream containing 5 to 10% by weight sodium chloride, evaporating said concentrated stream to a concentration of about 25% sodium chloride by weight, and electrolyzing said concentrated sodium chloride solution to produce chlorine gas, sodium hydroxide, and sodium hypochlorite.

5 Claims, 1 Drawing Figure

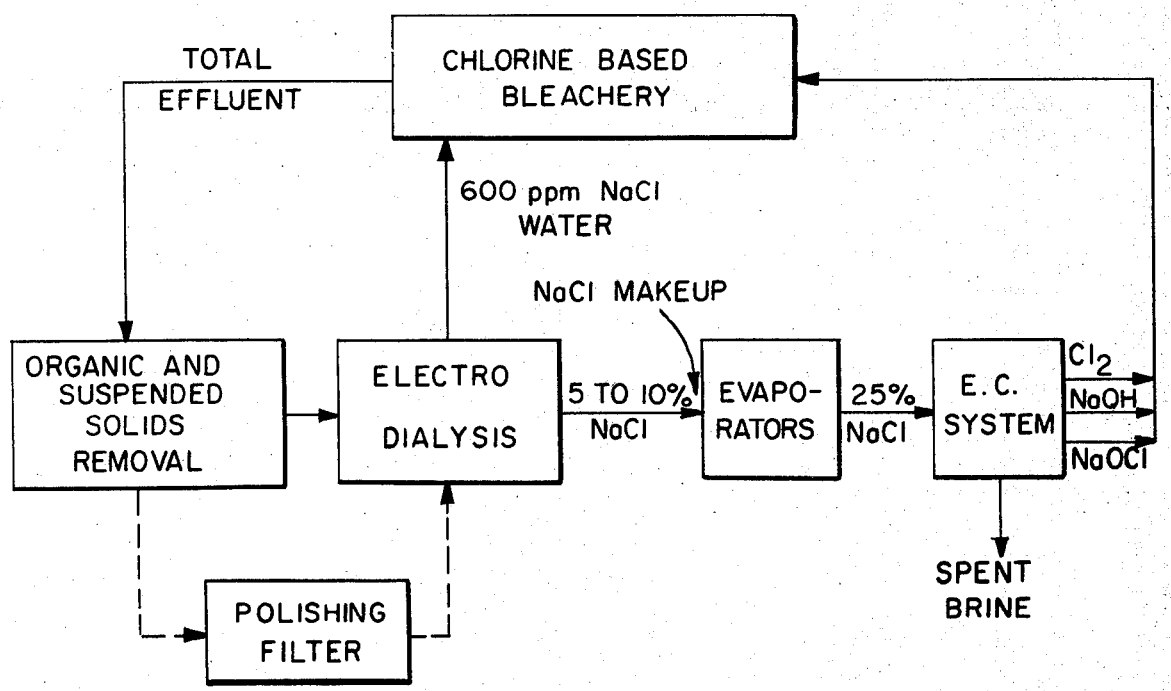

CHLORINE-BASED BLEACHERY EFFLUENT TREATMENT

BACKGROUND OF THE INVENTION

An integrated pulp and fine paper mill combines, broadly, wood pulping, pulp washing, pulp bleaching, and paper making operations. In each of these operations, large quantities of water are necessary and, in each, the resulting water effluent contains pollutants necessitating treatment of the effluent prior to recycling for use or prior to returning the water into a watercourse.

Of all these operations, the major source of pollution is the outfall effluent waste stream from the bleachery. The bleachery outfall, in fact, of an integrated pulp and fine paper mill, as described above, constitutes about 40% of the total mill effluent. In more specific terms, this bleachery effluent, in the case of a chlorine-based bleachery, contains most of the chloride content rejected by the mill, the major portion of the total mill color outfall (greater than 60%), and a substantial amount of total mill Biological Oxidation Demand (B.O.D.). From this effluent comes a major portion of the primary sludge separated from the mill effluent.

Present procedures for treating such bleachery effluents to purify the same act to reduce some of the pollutants, such as those primarily contributing to the high B.O.D., but they are not capable of reducing the chloride content or the color. Both levels remain unsatisfactorily high. At the present time, there are Governmental environmental requirements calling for lowering the chloride content of an effluent stream prior to discharge to about 250 parts per million. In addition, meeting the environmental requirements of Federal, state, and local governents, it has long been desired to recover the outfall constituents in the effluent as well as to be able to recycle the water for reuse in the paper-making operations in order to lower the large amount of water that are necessary for paper making and to reduce the energy required.

SUMMARY OF THE INVENTION

The present invention provides a process for treating chlorine-based bleachery effluents so as to remove the undesired constitutents and to enable reuse of the water, recovery of the useful constituents, and reduction in the amount of primary sludge.

Briefly stated, the present process utilizes only a chlorine and sodium salts in the bleach sequence followed by treating such bleachery effluent with aluminum ion to precipitate the organics and suspended solids, separating the solids from the liquid, electrodialyzing the treated effluent to provide one effluent stream having 200 to 600 parts per million sodium chloride, which can then be returned to the bleachery and a second effluent stream containing 5 to 10% Nacl, evaporating the concentrated second stream from the electrodialysis unit to form a 25% by weight sodium chloride solution, and electrolyzing the solution to produce chlorine gas, sodium hypochlorite and sodium hydroxide to be returned for use in the bleachery.

BRIEF DESCRIPTION OF THE DRAWING

The single FIGURE of the drawing is a flow diagram of the present process.

DETAILED DESCRIPTION

The instant invention will be described in connection with the drawing, it being understood that the bleachery may be part of an integrated paper mill or a separate facility. The bleach sequence used is not important, but it is essential that only a chlorine and sodium salts be used in such bleaching. As used herein, the term "a chlorine" is intended to mean and include the chlorine gas and the chlorine dioxide that are conventionally used in chlorine-based bleaching operations. The sodium salts used are sodium hydroxide, sodium chloride, and sodium hypochlorite.

The resulting bleachery effluent will contain, in addition to the sodium and chlorine, some sulfates, carbohydrates, lignins, and color bodies, and pollutants, either in solution or as suspended solids. Such effluent is high in B.O.D. and, as has been previously noted, contains by far the major source of pollutant solids from paper mill operations.

The initial step in treating the total effluent is to remove the organic matter and suspended solids. This is accomplished by using aluminum in the form of aluminum chloride, in an amount sufficient to precipitate the organics and suspended solids; preferably in an amount of from about 100 to 300 parts per million aluminum ion, as insoluble aluminum compounds. The precipitation is preferably carried out at the pH of the effluent, but, if the pH is much above 4, a mineral acid, such as hydrochloric acid, is used to lower the pH of the effluent to that level. Although not required, it is also preferred to add activated carbon with the aluminum to have a better draining cake. In commercial operations, it is preferred to carry out the precipitation in a conventional settler with the precipitate further treated, if desired, to recover the aluminum, activated carbon, and sodium chloride for recycling.

The effluent stream from the settler is then passed to an electrodialysis cell, preferably of the thin membrane type, where it is treated to provide one stream of 250 to 600 ppm sodium chloride water which is returned to the bleachery and a second stream of 5 to 10% sodium chloride. Prior to electrodialysis, the effluent stream may be first passed through a polishing filter to remove any solids that have not been precipitated.

The 5 to 10% sodium chloride stream is then passed to standard commercially available evaporators where this stream is concentrated to a 25% solids by weight sodium chloride solution. Slightly higher or lower concentrations can be effected, but it has been found that, for most effective subsequent electrolysis, a 25% concentration is best. As illustrated in the flow diagram, makeup sodium chloride can be added to the stream fed to the evaporators if there are sodium chloride losses in the overall bleachery and in the instant recycle system reducing the total quantity of sodium chloride below that necessary to produce the bleaching chemicals needed.

The final necessary step in the process is the electrolysis of the concentrated brine stream to form chlorine gas, sodium hydroxide, and sodium hypochlorite which are returned to the bleachery. The electrolysis is carried out in conventional electrolytic cells using the usual conditions employed to electrolyze a concentrated sodium chloride solution to the chemicals noted. Such a cell installation includes the usual brine purification unit which acts to remove multivalent impurities prior to electrolysis.

It should be emphasized that the settling tanks, electrodialysis units, evaporators, electrolytic cells and other apparatus used in carrying out the instant invention can be any commercially available for use for such purposes and that such apparatus does not form any part of the instant invention.

As to the operating conditions other than those specifically set forth above, the present invention uses the temperature and pH of the total bleachery effluent stream. That is to say, such streams have temperatures of about 100° to 130° F. and a pH of about 2.5 to 5. While the temperature and pH of any particular effluent stream will change as it is treated during the various steps of the instant process, there is no need to effect any change in such usual initial effluent temperatures and pH's to carry out the instant process.

The invention will be further described in connection with the following examples which illustrate the best modes currently contemplated for carrying out the instant invention but which must not be construed as limiting the invention in any manner whatsoever.

EXAMPLE 1

A total chlorine-based bleachery effluent, containing 185 ppm suspended solids, about 4440 ppm dissolved solids, and color of 1383 C.U., and at a temperature of about 120° F., was treated with 300 ppm aluminum ion in the form of aluminum chloride and the effluent filtered through a commercial filter (Cellite 540). The filtrate contained no suspended solids, about 4440 ppm dissolved solids, and color was 66.6 C.U.

The filtrate was then passed to a thin membrane electrodialysis unit (Ionics Staypac Electrodialysis Unit equipped with anionic membranes 111 EZL and cationic membranes 16 CZL). The membrane stack consisted of twenty cell pairs with an effective membrane area of five square feet. Dialysis was carried out in three stages with each stage consisting of a single pass through the unit. Table I below set forth the solids content of the concentrate into and out of each stage.

TABLE I

| | Total Dissolved Solids in ppm | | |
|---|---|---|---|
| | 1. Based On Gravimetric Determination | 2. Based on $Cl^- + SO_4^=$ | 3. Based on Conductivity |
| STAGE I | | | |
| Dilute in | 4,440 | 4,152 | 4,000 |
| Dilute out | 2,312 | 2,003 | 2,150 |
| Concentrate in | 73,210 | 76,954 | 70,000 |
| Concentrate out | — | — | — |
| STAGE II | | | |
| Dilute in | 2,108 | 2,136 | 1,980 |
| Dilute out | 968 | 778 | 790 |
| Concentrate in | 68,230 | 66,882 | 65,300 |
| Concentrate out | — | — | — |
| STAGE III | | | |
| Dilute in | 955 | 876 | 850 |
| Dilute out | 508 | 410 | 335 |
| Concentrate in | 70,110 | 67,104 | 67,000 |
| Concentrate out | — | — | — |

The effluent concentrate flowing to the evaporator system will be about 7% by weight NaCl and the sodium chloride water flowing to the bleachery would contain 335 to 508 ppm NaCl.

The 7% NaCl concentrate is evaporated in a multi-effect evaporator to a concentration of 25% NaCl and the further concentrated stream flowed to an electrolytic cell system consisting of an initial brine purification unit and a battery of standard bring electrolytic cells capable of electrolyzing the brine to chlorine gas, NaOH, and NaOCL, which chemicals are then returned to the bleachery. The resultant hydrogen can be vented or accumulated as an energy source and the spent brine can be returned to the evaporator or discharged into a watercourse.

EXAMPLES 2 TO 9

A series of organic and suspended solid filtrations was carried out on a total chlorine-based bleachery effluent having a pH of 2.5, 185 ppm suspended solids, 3,342 ppm total solids, and color of 1,799 C.U.

The precipitating ion and concentration thereof were varied, but precipitation otherwise carried out in each filtration under the same conditions using the Cellite 540 filter. The results are set forth in Table II below:

TABLE II

| | | Filtrate Characteristics | | |
|---|---|---|---|---|
| Example | | Conc. ppm $Al^{+3}/Fe^{+3}$ | Suspended Solids ppm | Color ppm C.U. |
| 2 | Effluent plus $AlCl_3$ | 300 | None | 66.6 |
| 3 | Same | 200 | None | 133.3 |
| 4 | Same | 100 | None | 420.0 |
| 5 | Same | 50 | None | 900.0 |
| 6 | Effluent plus $FeCl_3$ | 300 | None | 1,267.0 |
| 7 | Same | 200 | None | 1,667.0 |
| 8 | Same | 100 | None | 2,666.0 |
| 9 | Same | 50 | None | 3,000.0 |

It will be seen that ferric ion is not suitable for the reduction of the level of color which is necessary both to preserve the useful life of the dialysis membranes and the utility of the stream. Also, levels of aluminum ion below 100 ppm result in high color levels.

While the invention has been described in connection with preferred embodiments, it is not intended to limit the invention to the particular forms set forth, but, on the contrary, it is intended to cover such alternatives, modifications, and equivalents as may be included within the spirit and scope of the invention as defined by the appended claims.

What is claimed is:

1. The method of treating a chlorine-based bleachery effluent in which only a chlorine and sodium salts are used in the bleach sequence comprising the steps of adding aluminum ion to said effluent in an amount sufficient to precipitate substantially of the organics and suspended solids therein, separating the solids from said effluent, electrodialyzing the treated effluent to provide two effluent streams, one containing 200 to 600 parts per million sodium chloride which can be returned to the bleachery, and a second concentrated stream containing 5 to 10% by weight sodium chloride, evaporating said concentrated stream to a concentration of about 25% sodium chloride by weight, and electrolyzing said concentrated sodium chloride solution to produce chlorine gas, sodium hydroxide, and sodium hypochlorite.

2. The method of claim 1 wherein the aluminum ion is added in the form of aluminum chloride in an amount sufficient to give a level of 100 to 300 ppm aluminum ion.

3. The method of claim 2 including the step of filtering the effluent prior to electrodialysis.

4. The method of claim 1 wherein the bleachery effluent is the total effluent.

5. The method of claim 1 wherein the bleachery effluent is one or more of the bleachery stage effluents.

* * * * *